June 14, 1938. E. A. WILLIAMES 2,120,271

FLUID FUEL BURNING BLACKSMITH'S FORGE

Filed April 11, 1935

Section 4-4

INVENTOR
EVERETT A. WILLIAMES
BY
Harold Dodd
ATTORNEY

Patented June 14, 1938

2,120,271

UNITED STATES PATENT OFFICE 2,120,271

FLUID FUEL BURNING BLACKSMITH'S FORGE

Everett A. Williames, United States Navy

Application April 11, 1935, Serial No. 15,857

7 Claims. (Cl. 158—1)

(Granted under the act of March 3, 1883, as amended April 30, 1928; 370 O. G. 757)

My invention relates to a new and useful liquid fuel burning blacksmith's forge and has for its object the production of such forge having a heating volume or fire pot which may be readily maintained at a uniform volume notwithstanding the burning away of the fire brick or other material of which the same is formed; the heating of such volume or fire pot by liquid fuel subjected to the joint or several actions of high or low pressure air; and to produce a neat, rugged, simple and generally useful forge especially adapted for the burning of liquid fuel.

My invention solves the hereinafter indicated problems arising in such forges on shipboard as well as in shore service.

The foregoing objects, among others, are accomplished in the instance disclosed in the structure illustrated in the accompanying drawing, in which:

Fig. 4 is a sectional view on line 4—4 of Fig. 3.

Figure 1:
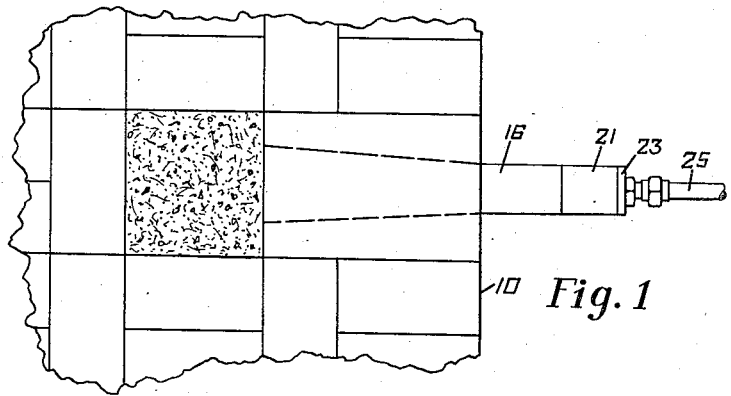
Fig. 1 is a top plan view of the forge.
Figure 2:
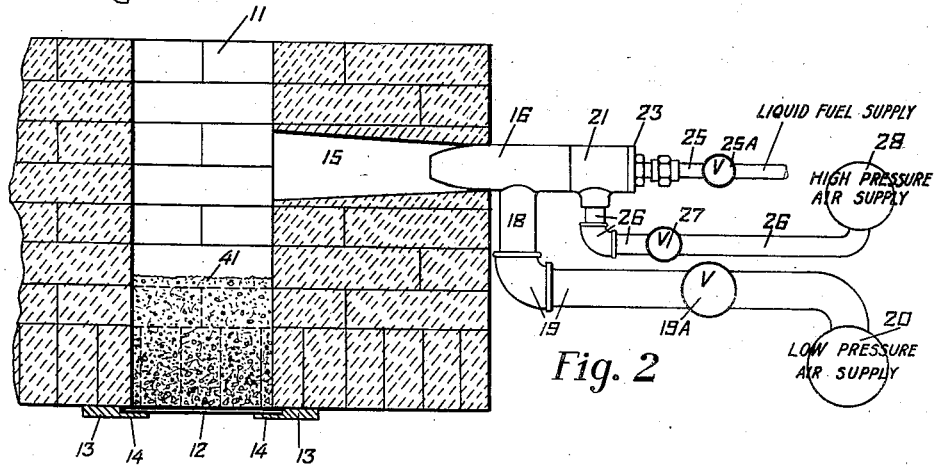
Fig. 2 is a central vertical sectional elevation view of the parts shown in Fig. 1, the burner not being in section.

In the drawing, the main body 10 of the forge is constructed of fire brick or other refractory material having a fire pot opening 11 of uniform cross section extending vertically through an intermediate portion of the body 10. The bottom of the fire pot opening 11 is closed, preferably by a metallic plate 12 which may be secured in any convenient or desirable manner. As shown in Fig. 2, the plate is secured by being mounted between bars 13 secured upon the bottom of the forge body 10 in any desirable manner, each bar 13 having a flange portion 14 engaging a portion of the lower side of plate 12. This plate preferably slides on the flanges 14 and between the bars 13 to open or close to any desired extent the bottom of the fire pot opening 11.

Extending laterally from one side of the fire pot opening 11 is a burner opening 15 preferably tapering with its large end opening into the fire pot 11 and its smaller end opening through a side wall of the forge body 10 at a point intermediate the upper and lower ends of said body 10.

Figure 3:
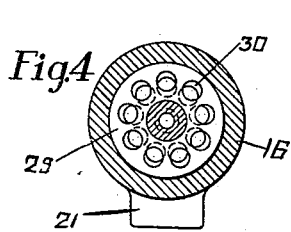
Fig. 3 is an enlarged central vertical sectional elevation view of the burner shown in Figs. 1 and 2.
Figure 3:
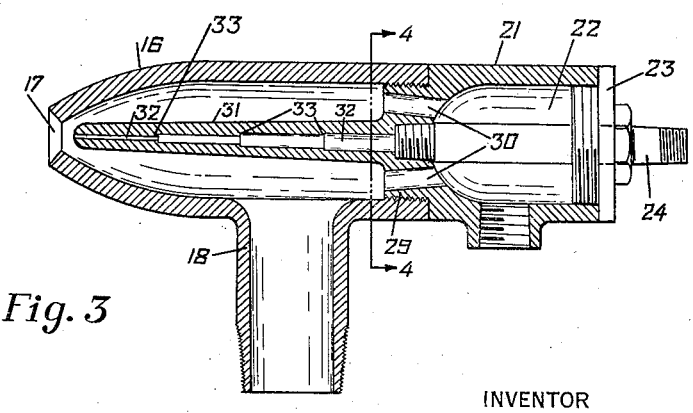

Into the small end of opening 15 extends a forced draft, liquid fuel burner casing 16 tapering at its inner end where it is provided with a central opening 17, Fig. 3. The casing 16 is hollow and is provided near its outer end with an integral, hollow, lateral projection 18 whose outer end is provided with screw threads or equivalent means for the ready attachment thereto of piping elements 19, controlled by diagrammatically indicated valve 19a, Fig. 2, leading to a low pressure air supply 20.

Into the outer end of casing 16 extends a casting 21 having a portion preferably of an external diameter equal to the internal diameter of the adjacent end of casing 16. In the outer end of casting 21 is a hollow, central, longitudinal chamber 22 open at its outer end, which has threaded therein a pipe or other plug 23 through whose center extends a pipe 24 whose outer end is provided with screw threads, Fig. 3, or other fastening means, for the securement thereto of pipe 25 having a valve diagrammatically shown at 25a, which pipe 25 is adapted to lead to a liquid fuel supply. Through the wall of chamber 22 extends a threaded opening into which is adapted to be secured the end of pipe element 26, having a valve diagrammatically shown at 27 and leading to a pressure air supply 28.

At the inner end of chamber 22 the casting 21 is provided with an integral, relatively thick shouldered portion 29 the exterior diameter of which fits within and is secured by screw threads or otherwise to the outer end of casing 16. Through shouldered portion 29 extend a plurality of relatively small openings 30, Figs. 3 and 4, extending laterally from chamber 22 and progressing at a slightly outwardly diverging angle therefrom into the bore of casing 16. The inner end of pipe 24 is threaded into or otherwise secured to the shouldered portion 29, from whose inner side extends a projection 31 extending from the shouldered portion 29 throughout substantially the length of casing 16 and terminating adjacent the opening 17 in casing 16, there being an annular opening between the casing 16 and said projection 31, which annular opening extends to and converges to its narrowest point between casing 16 and the end of projection 31 adjacent opening 17. Projection 31 is provided with a central longitudinal opening 32 extending from open pipe 24 through the end of projection 31, said opening 32 being of different progressively reduced diameters from the end of pipe 24 to the end of projection 31, said opening being smallest at the end of projection 31 and provided with a plurality of shoulders 33.

In the bottom of fire pot opening 11 and supported therein by plate 12, said or other refractory material in the form of granules or otherwise may be placed, and top surface 41 will form the bottom of the fire pot opening 11. When the volume of the fire pot opening 11 becomes increased due to the burning away or erosion of its walls or the loss of material from its bottom 41, the normal volume of the fire pot opening may be restored by the simple addition of sand or other refractory material deposited upon the bottom 41. This simple maintenance of the volume of the fire pot opening 11 materially contributes to the efficiency and heating uniformity of the fire pot opening 11.

The oil supply coming through control valve 25a and through pipe 24 to opening 32 under pressure is successively impacted against the shoulders 33 in the opening 32 of progressively decreasing diameter and thence through the smallest portion of opening 32 and thence through the end of projection 31. This projection 31 quickly becomes heated from the burner in operation and this heat, together with the successive impacting against the shoulders 33, produces an efficient atomization of the liquid fuel as it is discharged from the end of projection 31. The high pressure air supply from 28 is controlled by valve 27 entering chamber 22 from which it is discharged in multiple small outwardly diverging jets through the openings 30 impinging at an angle against the interior of casing 16 and are thence deflected convergingly against the end of projection 31 and through the annular space between the end of projection 31 and the wall of casing 16 adjacent the opening 17 where said air further impacts and tends to increase the atomization of the liquid fuel discharge from opening 32 at the end of projection 31.

The normal low pressure air supply is a low pressure blower which is diagrammatically shown at 20. This low pressure air supply from 20 through pipe elements 19 to hollow projection 18 of casing 16 may supplement the high pressure air supply from 28 or may be independently employed in emergencies when the high pressure air supply is temporarily not renewable. These simultaneous or alternate air supplies are provided to meet the heating conditions which may be encountered, as well as the difficulties arising from temporary lack of pressure air. When used simultaneously with or in lieu of the high pressure air supply, the low pressure air supply enters through the bore of portion 18 of casing 16 and is impacted upon and divided by projection 31 and flows longitudinally within casing 16 and along projection 31 until it impacts and tends to further atomize the liquid fuel spray discharged from the end of projection 31. Thence said impacted spray passes through opening 17 and combusts within the fire pot opening 11 whose open top may be partially closed, when desired, by any convenient refractory material.

My invention was developed to solve the problems arising on naval vessels in the making of emergency repairs and other emergency work requiring more or less forging.

The present invention provides a very compact, durable, simple and highly efficient liquid fuel burning forge which will maintain uniformity of heat and high heating efficiency in its fire pot throughout the life of the forge body, regardless of the extent to which the inner walls of its fire pot opening 11 may be burned away.

My invention also provides a forge which may protractedly withstand the rigor and varied use, as well as vibration encountered on board ship and elsewhere, and especially incident to the deviation from the vertical of the fire pot opening 11 and the action of the upwardly moving hot gases thereon, and contact with metal bars being heated, occasioned by the pitch and roll of vessels at sea containing forges of my invention.

The invention described herein may be manufactured and used by or for the Government of the United States of America for governmental purposes, without the payment of any royalty thereon.

What I claim is:

1. A fluid fuel burning blacksmith's forge, comprising a forge body having a fire pot opening extending vertically therethrough, at least a proportion of whose volume may be varied by use, means for opening and closing the lower end of the fire pot opening, a substantial volume of refractory material filling a portion of the lower end of the fire pot opening and adapted to be varied to maintain uniform the volume of the fire pot opening above the filling, said body being provided with a transverse opening extending through one side of the body and into the fire pot opening at a point intermediate its top and the filling and adapted to be connected to a burner.

2. A fluid fuel burning blacksmith's forge, comprising a forge body having a refractory walled fire pot opening in its top surface extending a substantial depth into the body, the bottom of said opening being formed of a variable volume of refractory granules for maintaining the substantially constant volume of the opening despite severance from or accumulation upon the wall of the opening, and the body being provided with a transverse opening extending through one side of the body and into the fire pot opening at a point intermediate its top and bottom and adapted to receive a burner.

3. A fluid fuel burner, comprising a hollow casing having a tapering end provided with an opening adapted to discharge combustion materials, said casing also having a low pressure air supply inlet leading at an angle to the bore of the casing near the tapered end of the casing, a high pressure air hollow manifold having an end wall thereof secured to the other end of the casing, said manifold end wall having a plurality of inclined openings leading to the hollow of the casing and a projection extending therefrom from a point within said openings to adjacent the opening in the tapered end of the casing, said projection having a longitudinal opening extending therethrough of a plurality of different diameters with intermediate shoulders, which diameters are smallest at the outer end of said projection, a high pressure air supply pipe leading into said manifold and a fuel supply pipe extending through said manifold and into said opening through said projection.

4. A fluid fuel burner, comprising a hollow casing having a tapering end provided with an opening adapted to discharge combustion materials, said casing also having a low pressure air supply inlet leading at an angle to the bore of the casing near the other end of the casing, a high pressure air hollow manifold having an end wall thereof secured to said other end of the casing, said manifold end wall having a plurality of inclined openings leading to the hollow of the casing and a projection extending therefrom from a point within said openings to adjacent the opening in the tapered end of the casing, said projection having a longitudinal opening extending therethrough of a plurality of different diameters with intermediate shoulders, which diameters are smallest at the outer end of said projection, a high pressure air supply pipe leading into said manifold, a plug screwed into the manifold, and a fuel supply pipe extending through the plug and manifold and into said opening through said projection.

5. In a fluid fuel burning blacksmith's forge, the combination of a forge body having a fire pot opening extending vertically thereinto, at least a portion of whose volume may be varied by use, a substantial volume of refractory material filling a portion of the fire pot opening and adapted to be varied to maintain uniform the volume of the fire pot opening, said body being provided with an opening extending into the fire pot, and a fluid fuel burner adapted to discharge into said opening.

6. A fluid fuel burner comprising in combination a hollow conical casing having a restricted outlet at one end, a pipe extending centrally and longitudinally through the hollow of said casing with its outer open end terminating within the casing adjacent said outlet, there being a space of substantial volume within said casing surrounding said pipe, and which space is conical at the conical end of said casing, means for supplying fluid fuel through said pipe, means for supplying air of high pressure through a small opening extending through the side of said casing and leading into said space near the other end of said casing, separate means for supplying air of lesser than the aforesaid pressure through an opening larger than the aforesaid opening extending through the side of said casing and leading into said space near the conical end of said casing, and valve means for controlling the flow through each of said air supply means such that varying proportions from nothing to full capacity of air may be admitted to said space through each of said air supply means to mix with the fluid fuel discharged from the open end of said pipe.

7. The fluid fuel burner of claim 6 with a transverse wall in said space at a point between said large and small openings and said wall having a plurality of openings extending through said wall.

EVERETT A. WILLIAMES.